United States Patent
Maattanen et al.

(10) Patent No.: US 10,820,218 B2
(45) Date of Patent: Oct. 27, 2020

(54) METHODS, APPARATUS AND COMPUTER PROGRAMS FOR CONTROLLING FEEDBACK ABOUT CHANNEL CONDITIONS

(71) Applicant: AVAGO TECHNOLOGIES INTERNATIONAL SALES PTE. LIMITED

(72) Inventors: Helka-Liina Maattanen, Helsinki (FI); Tommi Tapani Koivisto, Espoo (FI); Mihai Horatiu Enescu, Espoo (FI); Kari Paavo Kalevi Pietikainen, Espoo (FI)

(73) Assignee: AVAGO TECHNOLOGIES INTERNATIONAL SALES PTE. LIMITED, Singapore (SG)

(*) Notice: Subject to any disclaimer, the term of this patent is extended or adjusted under 35 U.S.C. 154(b) by 168 days.

(21) Appl. No.: 14/159,876

(22) Filed: Jan. 21, 2014

(65) Prior Publication Data
US 2015/0016288 A1 Jan. 15, 2015

(30) Foreign Application Priority Data
Jan. 18, 2013 (GB) .................................. 1300964.2

(51) Int. Cl.
*H04W 24/08* (2009.01)
*H04L 5/00* (2006.01)
(Continued)

(52) U.S. Cl.
CPC ............ *H04W 24/08* (2013.01); *H04B 7/066* (2013.01); *H04L 1/003* (2013.01); *H04L 1/0026* (2013.01);
(Continued)

(58) Field of Classification Search
CPC .............. H04W 24/08; H04W 15/0057; H04L 5/0057; H04L 5/007; H04L 1/003;
(Continued)

(56) References Cited

U.S. PATENT DOCUMENTS

| 2007/0026813 A1* | 2/2007 | Khan | ..................... H04L 5/0044 |
| | | | 455/69 |
| 2009/0010319 A1* | 1/2009 | Sun | ........................ H04L 1/0029 |
| | | | 375/224 |

(Continued)

FOREIGN PATENT DOCUMENTS

| EP | 1845678 A1 * | 10/2007 | ........... H04L 1/0001 |
| EP | 1863209 | 12/2007 | |

(Continued)

OTHER PUBLICATIONS

R1-130417;3GPP TSG-RAN WG1 Meeting #72,; Downlink MIMO CSI feedback enhancements for LTE-Advanced Jan. 28-Feb. 1, 2013 (2 pages).

(Continued)

*Primary Examiner* — Charles C Jiang
*Assistant Examiner* — Voster Preval
(74) *Attorney, Agent, or Firm* — Xsensus LLP (57) ABSTRACT

A user equipment (UE) provides feedback about channel conditions. From a set of primary sub-bands subject to channel state information reporting by the UE, there is identified one or more of the primary sub-bands for reporting channel quality with a finer frequency-domain granularity than other primary sub-bands of the set (202). The one or more is less than all primary sub-bands in the set. In various embodiments, either the UE or the network can select which are the primary sub-bands to be identified for the finer granularity reporting, and the selection can be for example the best primary sub-bands or those with the (Continued)

highest variance in a measure of channel quality or random (206). Then for each of the identified primary sub-bands, the UE measures and reports the channel quality with the finer frequency-domain granularity for each secondary sub-band whose frequency lay within the respective identified primary sub-band.

17 Claims, 3 Drawing Sheets

(51) Int. Cl.
   *H04B 7/06* (2006.01)
   *H04L 1/00* (2006.01)
(52) U.S. Cl.
   CPC .......... *H04L 5/0057* (2013.01); *H04B 7/0632* (2013.01); *H04B 7/0639* (2013.01); *H04L 5/0051* (2013.01)
(58) Field of Classification Search
   CPC ... H04L 1/0026; H04L 5/0051; H04B 7/0632; H04B 7/0639
   USPC .......................................................... 370/252
   See application file for complete search history.

(56) References Cited

U.S. PATENT DOCUMENTS

| | | | | |
|---|---|---|---|---|
| 2009/0154588 | A1* | 6/2009 | Chen | H04L 1/0029 375/267 |
| 2010/0118783 | A1* | 5/2010 | Baker | H04B 7/0417 370/328 |
| 2011/0150052 | A1* | 6/2011 | Erell | H04B 7/0641 375/219 |
| 2012/0051413 | A1* | 3/2012 | Xiao | H04L 5/0044 375/224 |
| 2012/0076028 | A1* | 3/2012 | Ko | H04B 7/0626 370/252 |
| 2012/0127869 | A1* | 5/2012 | Yin | H04L 5/001 370/252 |
| 2013/0336176 | A1* | 12/2013 | Rubin | H04B 7/26 370/280 |
| 2014/0044061 | A1* | 2/2014 | Yue | H04B 7/063 370/329 |
| 2014/0092787 | A1* | 4/2014 | Han | H04W 4/70 370/280 |
| 2015/0063286 | A1* | 3/2015 | Robert Safavi | H04L 5/0053 370/329 |
| 2015/0195729 | A1* | 7/2015 | Simonsson | H04W 24/10 370/252 |
| 2017/0180016 | A1* | 6/2017 | Park | H04B 7/0617 |

FOREIGN PATENT DOCUMENTS

| | | |
|---|---|---|
| EP | 1863209 A1 * | 12/2007 |
| EP | 1845678 | 5/2009 |
| WO | 2007073121 | 6/2007 |
| WO | WO 2009/022820 A2 | 2/2009 |
| WO | 2009158481 | 12/2009 |
| WO | 2010127710 | 11/2010 |

OTHER PUBLICATIONS

RP-121416;Further downlink MIMO enchancement for LTE-Advanced; (6 pages).
Office Action dated Jun. 24, 2016 in German Patent Application No. 10 2014 200 478.0.

* cited by examiner

202: from a set of primary sub-bands subject to CSI reporting by the UE, identify one or more of the primary sub-bands for reporting channel quality with a finer frequency-domain granularity than other primary sub-bands of the set

↓

204: for each of the identified primary sub-bands, measuring and reporting the channel quality with the finer frequency-domain granularity for each secondary sub-band whose frequency lay within the respective identified primary sub-band 206: the UE selects the one or more primary sub-bands:
- the primary sub-band(s) of the set having best channel quality, OR
- the primary sub-band(s) of the set having highest variance in a measure of channel quality, OR
- a random selection 208: the reporting of block 204 includes:
    reporting a CQI for each of the other primary sub-bands of the set which are not among the identified one or more primary sub-bands; and
    for each of the identified one or more primary sub-bands, reporting only a CQI for each of the secondary sub-bands corresponding to the respective identified primary sub-band.

210: the reporting of block 204 includes:
    reporting a CQI for each of the identified one or more primary sub-bands; and
    for each secondary sub-band, reporting a $\Delta$CQI relative to the CQI of its corresponding primary sub-band 212: the UE identifies the one or more primary sub-bands from a message wirelessly received from a network access node (eNB selects)

214: the message is wirelessly received in response to the UE reporting a CQI for each of the primary sub-bands in the set; and
    after receiving the message, reporting of block 204 includes reporting a CQI for each secondary sub-band whose frequency lay within any of the identified one or more primary sub-bands

Figure 3

METHODS, APPARATUS AND COMPUTER PROGRAMS FOR CONTROLLING FEEDBACK ABOUT CHANNEL CONDITIONS

TECHNICAL FIELD

The present invention relates to methods, apparatus and computer programs for controlling a user equipment (UE) to provide feedback about channel conditions. The exemplary and non-limiting embodiments of this invention relate generally to wireless communication systems, methods, devices and computer programs and particular examples relate to selecting which sub-bands on which to report channel conditions such as channel state information (CSI), as well as the associated reporting and signalling.

BACKGROUND

Single cell single-user (SU-) and multi-user (MU-) multiple-input multiple-output (MIMO) techniques are used in the Third Generation Partnership Project (3GPP) Long Term Evolution (LTE) and LTE-Advanced (LTE-A) radio access technologies for improving cell throughput and hence spectral efficiency. MIMO techniques have been supported since the first release of LTE (Release 8), and there have not been many enhancements to the channel state information (CSI) feedback required by the above techniques.

This is changing. Document RP-121416 entitled "Further Downlink MIMO Enhancement for LTE-Advanced" is a work item that was approved in plenary meeting RAN #58. That document lists objectives for evaluating CSI feedback enhancements, including:

- 4-tx PMI feedback codebook enhancements to provide finer spatial domain granularity and support different antenna configurations for macro and small cells, especially cross-polarised antennas, both closely- and widely-spaced, and non co-located antennas with power imbalance
- a new CSI feedback mode providing sub-band CQI and sub-band PMI
- finer frequency-domain granularity
- enhanced control of the reported rank and corresponding assumptions for CQI/PMI derivation, to improve support for MU-MIMO.

This ongoing work item targets improvements in the CSI feedback, especially with antenna deployments with arrays of up to four transmit antennas (4-tx) and multi-user MIMO in mind. It also mentions finer frequency domain granularity for CSI feedback. This arises because for frequency-selective channels the current sub-band bandwidths (e.g. 6 PRBs) may be too large to capture properly the frequency-selectivity of the channel and on the other hand frequency-selectivity of the interference. So performance improvements could possibly be obtained by increasing the frequency-domain granularity of the CSI feedback to match better with the radio environment.

This is not simple to implement in a practical system for several reasons. First, increased CSI granularity means increased uplink overhead because the user equipment (UE) will need to report CSI for an increased number of sub-bands. Second, increasing the CSI granularity means greatly increasing the computational processing the UE must undergo to obtain it, since the UE must compute more precoding matrix indicators (PMIs) and channel quality indicators (CQIs). For example, halving the sub-band size would mean doubling the UE's processing complexity as well as the uplink feedback overhead.

What is needed in the art is a way to increase the CSI feedback granularity so as to improve system performance while keeping the UE's processing complexity and the feedback signalling overhead within acceptable bounds, preferably far below the doubling mentioned above. Teachings related to CSI feedback may be seen at PCT patent application publications WO2007073121A1 by Samsung, WO2009158481A2 by Nortel, and WO2010127710A1 by Nokia.

SUMMARY

According to a first aspect of the present invention, there is provided a method for controlling a user equipment (UE) to provide feedback about channel conditions, the method comprising: from a set of primary sub-bands subject to channel state information reporting by the UE, identifying one or more of the primary sub-bands for reporting channel quality with a finer frequency-domain granularity than other primary sub-bands of the set, where the one or more is less than all primary sub-bands in the set; and, for each of the identified primary sub-bands, measuring and reporting the channel quality with the finer frequency-domain granularity for each secondary sub-band whose frequency lay within the respective identified primary sub-band.

According to a second aspect of the present invention, there is provided apparatus for controlling a user equipment to provide feedback about channel conditions, the apparatus comprising a processing system constructed and arranged to cause the apparatus at least to: identify, from a set of primary sub-bands subject to channel state information reporting by the UE, one or more of the primary sub-bands for reporting channel quality with a finer frequency-domain granularity than other primary sub-bands of the set, where the one or more is less than all primary sub-bands in the set; and for each of the identified primary sub-bands, measure and report the channel quality with the finer frequency-domain granularity for each secondary sub-band whose frequency lay within the respective identified primary sub-band.

According to a third aspect of the present invention, there is provided a computer program comprising a set of computer executable instructions for controlling a user equipment (UE) to provide feedback about channel conditions, the set of computer executable instructions comprising: code for identifying, from a set of primary sub-bands subject to channel state information reporting by the UE, one or more of the primary sub-bands for reporting channel quality with a finer frequency-domain granularity than other primary sub-bands of the set, where the one or more is less than all primary sub-bands in the set; and code for measuring and reporting, for each of the identified primary sub-bands, the channel quality with the finer frequency-domain granularity for each secondary sub-band whose frequency lay within the respective identified primary sub-band.

According to a fourth aspect of the present invention, there is provided a method for controlling a network access node, the method comprising: receiving from a user equipment channel state information for a set of primary sub-bands; selecting from the set one or more of the primary sub-bands for the reporting of channel quality with a finer frequency-domain granularity than what was received in the channel state information, where the one or more is less than all primary sub-bands in the set; identifying to the user equipment the selected one or more primary sub-bands of the set; and receiving from the user equipment, for each secondary sub-band whose frequency lay within an identified primary sub-band, an indication of channel quality with the finer frequency-domain granularity.

According to a fifth aspect of the present invention, there is provided apparatus for controlling a network access node, the apparatus comprising a processing system constructed and arranged to cause the apparatus at least to: receive from a user equipment channel state information for a set of primary sub-bands; select from the set one or more of the primary sub-bands for the reporting of channel quality with a finer frequency-domain granularity than what was received in the channel state information, where the one or more is less than all primary sub-bands in the set; identify to the user equipment the selected one or more primary sub-bands of the set; and receive from the user equipment, for each secondary sub-band whose frequency lay within an identified primary sub-band, an indication of channel quality with the finer frequency-domain granularity.

According to a sixth aspect of the present invention, there is provided a computer program comprising a set of computer executable instructions for controlling a network access node, the set of computer executable instructions comprising: code for, in response to receiving from a user equipment channel state information for a set of primary sub-bands, selecting from the set one or more of the primary sub-bands for the reporting of channel quality with a finer frequency-domain granularity than what was received in the channel state information, where the one or more is less than all primary sub-bands in the set code for identifying to the user equipment the selected one or more primary sub-bands of the set; and code for receiving from the user equipment, for each secondary sub-band whose frequency lay within an identified primary sub-band, an indication of channel quality with the finer frequency-domain granularity.

The processing systems described above may comprise at least one processor and a memory storing a set of computer instructions, the processing system being configured to cause the apparatus at least to operate as described above.

There may be provided a computer readable memory tangibly storing a set of computer executable instructions as described above.

Further features and advantages of the invention will become apparent from the following description of preferred embodiments of the invention, given by way of example only, which is made with reference to the accompanying drawings.

BRIEF DESCRIPTION OF THE DRAWINGS

FIG. 2 shows a logic flow diagram that illustrates an example of a method for operating a user equipment/UE, and a result of execution by an apparatus of a set of computer program instructions embodied on a computer readable memory for operating such a UE, in accordance with certain exemplary embodiments of this invention.

DETAILED DESCRIPTION

The examples below are in the context of the Evolved Universal Terrestrial Access Radio Access Network (E-UTRAN, sometimes referred to as LTE or LTE-A), but these radio access technologies are not limiting to the broader teachings herein. In other deployments these teachings for reporting channel conditions may be utilised with other types of radio access technologies (RATs), including but not limited to Universal Terrestrial Access Radio Network (UTRAN), Global System for Mobile Communications (GSM), Wideband Code Division Multiple Access (WCDMA), and other wireless radio technologies now established or yet to be developed. Also, the specific names of the measured parameters, such as CQI, CSI, PMI and the like, are not limiting to the broader teachings but are utilised herein to present more thorough examples.

The time domain structure of LTE/LTE-A consists of radio frames whose length is 10 ms. One radio frame consists of ten 1 ms subframes which each consist of two 0.5 ms slots. In the frequency domain, the slots are further divided into groups of 12 subcarriers which are called physical resource blocks (PRB). A length, in the time domain, of one physical resource block is the length of a slot, thus 0.5 ms. The overall bandwidth of one PRB is 180 kHz.

In conventional LTE, the CSI feedback from the user equipment (UE) consists of rank indication (RI), precoding matrix index (PMI) and channel quality measure (CQI); or only CQI in the case of non-PMI/RI-based operation. Conventional LTE allows wideband or per sub-band reporting of CQI and PMI, where one reporting sub-band consists of N PRBs and the value for N depends on the system bandwidth and also on the feedback mode. For example, assuming a 10 MHz bandwidth and feedback modes other than mode 2-2, the sub-band size is 6 PRBs and the RI is always reported wideband.

In technical specification 3GPP TS 36.213, different feedback modes are defined describing combinations of wideband and sub-band reporting of CQI and PMI. For example, feedback mode 3-1 means wideband PMI reporting and sub-band CQI reporting. Another feedback mode 3-2, where both PMI and CQI are reported per sub-band, has previously been discussed in 3GPP but that mode has not been accepted in the Standard as it does not provide sufficient gain versus the increase in the feedback load. In feedback mode 2-2 the UE reports PMI and CQI for the best M sub-bands, where M is an integer and the best M sub-bands are selected by the UE. Conventional LTE defines a further feedback mode 1-2 with sub-band PMI and wideband CQI.

One disadvantage of all of the three conventional LTE feedback modes summarised above is the nonflexible reporting and fixed sub-band granularity across the whole band (fixed sub-band size relative to the whole band). Further, this fixed sub-band size is relatively large, hence the work item noted in the background section for improved granularity.

Simply increasing the feedback granularity, especially for mode 3-2, would result in a very high feedback signalling load. The best-M average modes are mode 2-0 (no PMI) and mode 2-2 (multi PMI), where sub-band CQI (in 2-2 also PMI) are reported for the selected best M sub-bands. The best-M reporting may also be improved by increasing the granularity, but one significant disadvantage for the best-M reporting is that they will be missing CQIs on certain sub-bands which leads to scheduling restrictions and inefficiencies. From the UE perspective that may result in the UE not being scheduled at all, or scheduled with limited resources, or scheduled using only wideband CQI. Any of these lead overall to less efficient transmissions.

Figure 1:
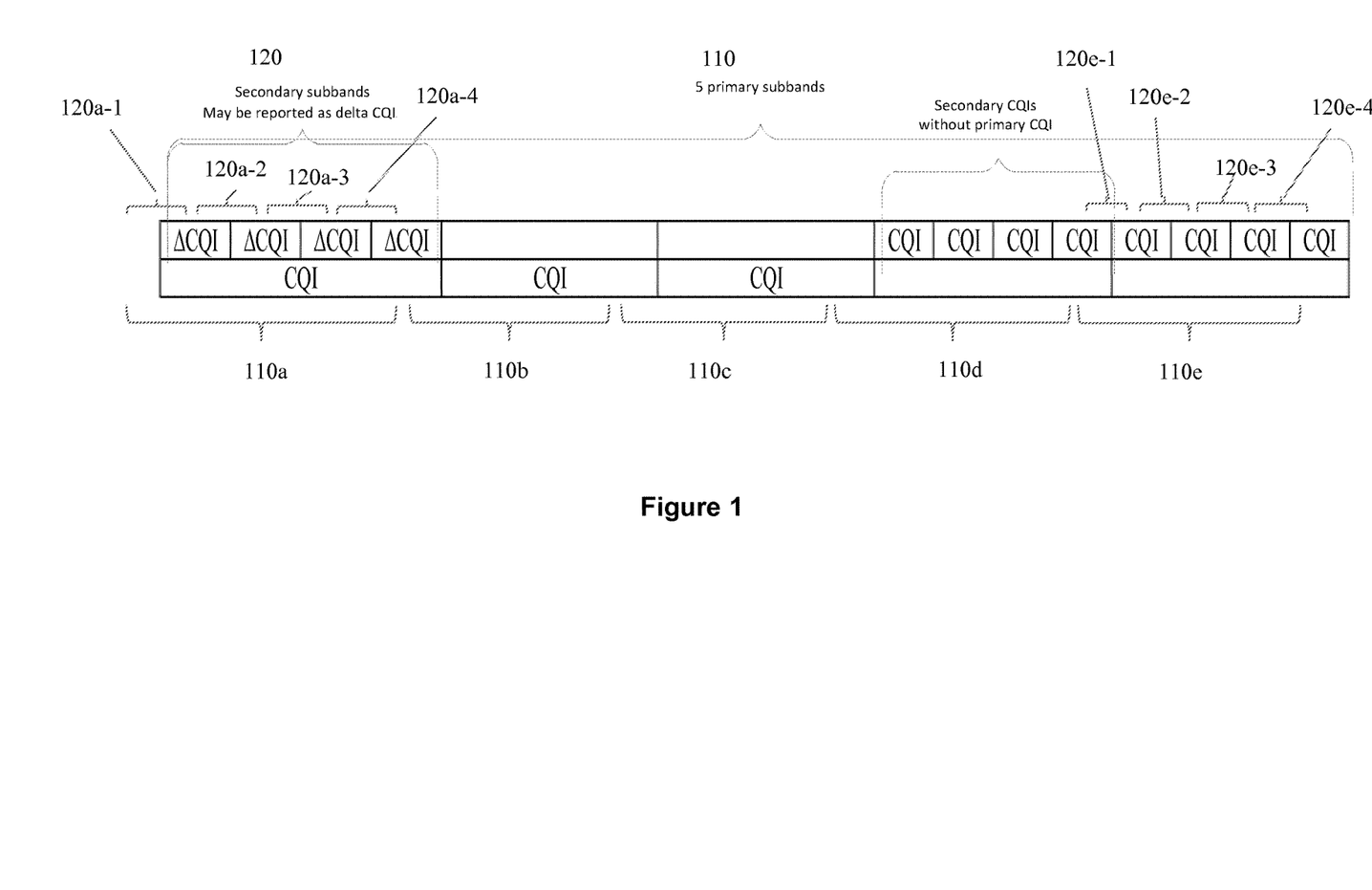
FIG. 1 shows a schematic diagram showing an example of primary sub-bands and secondary sub-bands which are different frequency granularity for measuring and reporting according to these teachings, where frequency runs along the horizontal axis in FIG. 1.

For flexible sub-band CQI reporting, two sizes of sub-bands are defined, with sub-band size 1 larger than sub-band size 2. For convenience and as illustrated at FIG. 1, the sub-bands of size 1 are named as primary sub-bands 110 and sub-bands of size 2 as secondary sub-bands 120. As can be seen there are shown 5 primary sub-bands 110a to 110e, and each primary sub-band is made up of several secondary sub-bands. For example, secondary sub-bands 120a-1 to 120a-4 all lay within the primary sub-band 110a; and secondary sub-bands 120e-1 to 120e-4 all lay within the primary sub-band 110e. In order to limit the feedback reporting overhead, according to embodiments of these teachings there is a new CSI feedback reporting scheme in which finer granularity (the granularity of the secondary sub-bands of FIG. 1) is reported only on selected primary sub-bands and the other primary sub-bands which the UE reports are reported with a coarser granularity.

The selection of which primary sub-bands are reported with finer granularity can be performed by the UE itself or by the network access node. When the UE selects the primary sub-bands, all CQIs with finer and coarser granularity are to be reported together. When the network access node/eNB selects the primary sub-bands, the CQI reporting procedure is two-phased as the network access node asks for refinement for the selected primary sub-bands which the eNB identifies to the UE.

The primary sub-bands to be reported with finer granularity may be selected based on at least two different metrics when the selection is made by the UE. A first sub-band selection option or metric is to select the N best primary sub-bands. The second sub-band selection option is to select primary sub-bands using deviation in the signal to interference-plus-noise ratio (SINR) within a given primary sub-band as a metric for selecting the finer granularity for that primary sub-band.

The first selection option/metric is based on the assumption that finer granularity (and hence more accurate) feedback is most useful for sub-bands with better SINR conditions and the second selection option/metric chooses finer granularity when there is more deviation within the band. Any other selection metric can also be used by the UE. For example, the selection can be random.

As will be detailed further below, to save on signalling overhead in some embodiments the CQIs of the secondary sub-bands may be reported as relative CQIs to the CQI on the corresponding primary sub-band. This is shown by example in FIG. 1 for the primary sub-band 110a. The finer granularity is measured on secondary sub-bands 120a-1 to 120a-4. In this example primary sub-band 110a is selected for finer granularity reporting. The measurements which the UE reports for this selected sub-band 110 is then CQI for the whole primary sub-band 110a (which is a coarser granularity channel quality measurements), and also the relative CQIs (shown in FIG. 1 as ΔCQI) for each of the secondary sub-bands 120a-1 to 12a-4 which lay in that selected primary sub-band 110a (these ΔCQIs are the finer granularity channel quality measurements). So in this embodiment, for the selected primary sub-band 110a, both coarse and fine granularity CQI is reported.

The UE's computational burden may be reduced if the CQIs for the primary sub-bands are calculated with less computations than the finer CQIs and if the finer CQIs are not required for selecting the primary sub-bands for finer reporting. For example, if the primary sub-bands are selected with best N metric or randomly, or in the case the network indicates the selected sub-bands.

For the case in which the network/eNB is to select the primary sub-bands for which finer granularity CQI is to be reported, the UE can first measure and report the coarser granularity CQIs on the primary sub-bands. The network, now having the coarser granularity CQIs for the primary sub-bands, can then request the UE to report finer granularity CQI on certain of those primary sub-bands, which the network identifies to the UE. As its selection metric, the network may use best N or any other selection option based on information the network possesses, for example, other user reported CQIs, traffic load, etc. In another embodiment the network's selection may be random.

In one embodiment the network can identify to the UE these selected primary sub-bands merely as one or more primary sub-bands for which finer granularity reporting is requested, which the UE interprets to mean it should report CQI for all of the secondary sub-bands that comprise the network-identified primary sub-band(s). Using FIG. 1 as an example, assume the UE first reports coarse granularity on all five primary sub-bands 110a to 11e, and the network selects primary sub-band 110e for finer granularity reporting and indicates this selection to the UE. The UE will then report the CQIs for secondary sub-bands 120e-1 to 120e-4, which together are the finer granularity CQI for the indicated primary sub-band 110e.

In this embodiment the eNB will transmit additional CSI requests which identify the primary sub-bands for which finer granularity CSI is to be reported (or equivalently the network can identify the secondary sub-bands directly). As a consequence, the UE will first be reporting the coarser granularity CQIs which are measured across the larger frequency bandwidths of the primary sub-bands 110a-110e, and then will be separately reporting the finer granularity CQIs which are measured across the smaller frequency bandwidths of the secondary sub-bands, the latter being in response to the network's further request for finer granularity CQI.

For the case in which the UE selects the secondary sub-bands for which CQI is to be reported, the UE can make the selection as above (best-N or highest variance in SINR/CQI within a primary sub-band, or any other metric), and in this case the UE's reporting of primary and secondary CQI values can be in one reporting instance. In one implementation, the UE's single report can have the CQI for each primary sub-band and the relative CQIs for the selected set of secondary sub-bands and report the different CQIs along with the respective primary sub-band indices. In another implementation, instead of the sub-band indices, the report can include a bitmap telling which primary sub-bands are reported with finer granularity CQIs (those for the secondary sub-bands). The bitmap and or the sub-band indexes may be optional for the case of best N sub-band selection since the network may deduce from the coarser granularity CQIs the N best secondary sub-bands.

Above was described one example in which the finer granularity CQIs are reported as relative (ΔCQI) to the coarser granularity CQI of the corresponding primary sub-band. This reporting technique can be used regardless of whether it is the UE or the network eNB that selects which of the primary sub-bands are to be subject to finer granularity CSI reporting. Similarly, when both the coarse and the fine granularity CQI values are reported (not any ΔCQIs but only direct CQIs), either the UE or the eNB can make the selection of which primary sub-bands are to be subject to fine granularity CQI reporting, whether reported with sub-band indices or as a bitmap.

FIG. 1 illustrates a still further option for saving on CQI reporting overhead, which is relevant only for the case in which the UE selects which primary sub-band(s) is/are to be subject to fine granularity CQI reporting. Specifically, consider an example in which the UE's feedback mode directs it to report only on primary sub-bands 110b, 110c, 110d and 110e. The UE measures each of those four sub-bands and from those measurements it chooses that primary sub-bands 110d and 110e are to get fine granularity CQI reporting, and consequently measures fine granularity CQI for secondary sub-bands 120e-1 to 120e-4 as well as the four (un-numbered) secondary sub-bands that make up primary sub-band 110d. When reporting, the UE can then in an embodiment send the coarse granularity CQI for primary sub-bands 110b and 110c, and also the fine granularity CQI for those eight secondary sub-bands. Excluded from this CQI report is the coarse granularity CQI for primary sub-bands 110d and 110e.

Following is a review of the overall CSI measuring and reporting procedures which encompass various ones of the above embodiments. First, the UE measures the radio channel based on configured CSI-RS resources. The UE then determines the RI and CQI/PMI with the first or coarser frequency-domain granularity (e.g. 6 PRBs for the case of a 10 MHz bandwidth). The UE then selects the best PMI and corresponding CQI for reporting using the first/coarser granularity (for each primary sub-band). Note that depending on the feedback mode, one of CQI or PMI can be based on the full bandwidth (wideband) whereas the other one of CQI or PMI could be based on the first/coarser frequency-domain granularity.

For the case in which it is the UE which selects which of the primary sub-bands are to be subjected to finer granularity reporting, then for an integer number N of the primary sub-bands of the first/coarser granularity (these N are the primary sub-bands selected from the whole set of primary sub-bands on which the UE is to report CSI), the UE calculates further CSI feedback using a second/finer frequency-domain granularity (these are the CQIs for the smaller/secondary sub-bands). In one alternative, the selected N primary sub-bands are the best N primary sub-bands. In another alternative, the selected N primary sub-bands are the ones with most variation in terms of channel quality. The UE then sends the feedback to the eNB, and this feedback includes the CSI feedback based on the first/course granularity. In one embodiment, the coarser granularity CQI for those primary sub-bands (the selected N sub-bands) for which feedback with the second/finer granularity is reported can be excluded from the feedback reporting. The CSI feedback based on the second/finer granularity for the secondary sub-bands is also reported. If the eNB is unable to deduce which are the selected primary sub-bands from the CQIs (which would typically be the case for UE-selected best-N reporting) then the CQI report can also include information about which is/are the selected primary sub-bands (or equivalently which are the secondary sub-bands being reported). Such information can be for example the sub-band indices and/or bitmap indicating the selected primary sub-band(s).

For the case in which it is the eNB that selects which of the primary sub-bands are to be subjected to finer granularity reporting, then the UE sends the feedback to the eNB, the feedback comprising the CSI feedback for the first/coarser frequency-domain granularity. The UE receives a request from the eNB to report CSI using the second/finer frequency-domain granularity, along with the indication of which sub-bands should be used. This indication can indicate the eNB's selected primary sub-band(s), or it may indicate directly the secondary sub-bands which correspond to that/those selected primary sub-band(s). The UE then calculates further CSI feedback using the second/finer granularity for the selected sub-bands which the network identified to the UE. Finally the UE sends that further feedback to the eNB which is the second/finer granularity CQI for the secondary sub-bands that lie within/correspond to the network-selected primary sub-band(s).

Now consider the above process from the perspective of the eNB (or other network access node). For the case in which it is the UE that selects which of the primary sub-bands are to be subjected to finer granularity reporting, first the eNB receives the reported CSIs of the first/coarser granularity, and the CSIs of the second/finer granularity for the selected primary sub-band(s) which are the CSIs for the secondary sub-bands lying within that/those selected primary sub-bands, and also the indication of which secondary sub-bands are being reported (or equivalently which primary sub-band/s is/are being reported with finer granularity. The eNB then uses the received channel state information for scheduling.

For the case in which it is the eNB that selects which of the primary sub-bands are to be subjected to finer granularity reporting, first the eNB receives the reported CSIs of the first/coarser granularity. Then the eNB may send the UE a request for second/finer granularity CSI reporting on one or more selected primary sub-bands, which is equivalently a request for CSI reporting on the secondary sub-bands corresponding to that one or more selected primary sub-band(s). The eNB then receives the reported CSIs for the secondary sub-bands which is the finer granularity CSI, and the eNB uses that received information for scheduling.

Embodiments of these teachings provide the technical effect of enabling greater flexibility for high granularity feedback reporting, as well as improving performance without excessive additional uplink overhead or UE computational complexity. Specific advantages over conventional LTE feedback modes 3-1 and 3-2 without higher granularity is that these teachings provide for increased reporting accuracy while still balancing against the increased feedback overhead and UE computational complexity. A specific advantage over the conventional LTE best-M reporting without higher granularity is that implementations of these teachings would not result in scheduling restrictions.

FIG. 2 presents a summary of the some of the above teachings for controlling and for operating a UE, such as for example a mobile phone, mobile terminal, cellular handset and the like, to provide feedback about channel conditions. Block 202 outlines that, from a set of primary sub-bands subject to channel state information reporting by the UE, there is identified one or more of the primary sub-bands for reporting channel quality with a finer frequency-domain granularity than other primary sub-bands of the set. This "set" of primary sub-bands are for example set by the CSI feedback mode, and this/these identified one or more primary sub-bands is less than all of the primary sub-bands in the set. Then block 204 specifies that for each of the identified primary sub-bands, the UE measures and reports the channel quality with the finer frequency-domain granularity for each secondary sub-band whose frequency lay within the respective identified primary sub-band.

Some of the non-limiting implementations detailed above are also summarised at FIG. 2 following block 204. Block 206 specifies that it is the UE that selects the one or more primary sub-bands; that is the UE identifies for itself the selected primary sub-bands. In one embodiment the UE identifies the one or more primary sub-bands for reporting channel quality with the finer frequency-domain granularity as the primary sub-band(s) of the set having best channel quality. In another embodiment the UE identifies the one or more primary sub-bands for reporting channel quality with the finer frequency-domain granularity as the primary sub-band(s) of the set having highest variance in a measure of channel quality, and for example such a measure may be CQI or SINR. And in a still further embodiment the UE randomly selects the one or more primary sub-bands for reporting channel quality with the finer frequency-domain granularity. These are only non-limiting examples; in other embodiments still different metrics can be used to select the primary sub-bands for finer granularity reporting.

The embodiment of block 208 is also relevant to the embodiment in which the UE selects the one or more primary sub-bands. Specifically, the reporting first stated at block 204 is stated more particularly at block 208 as a) reporting a channel quality indicator for each of the other primary sub-bands of the set which are not among the identified one or more primary sub-bands; and b) for each of the identified one or more primary sub-bands, reporting only a channel quality indicator for each of the secondary sub-bands whose frequency lay within the respective identified primary sub-band. FIG. 1 represents this embodiment for primary sub-bands 110d and 110e, where coarse granularity CQI for those selected primary sub-bands is not reported but fine granularity for the corresponding eight secondary sub-bands is reported.

The embodiment of block 210 is relevant to the embodiments in which either the UE or the eNB selects the one or more primary sub-bands. Specifically, the reporting first stated at block 204 is stated more particularly at block 210 as a) reporting a channel quality indicator for each of the identified one or more primary sub-bands; and b) for each secondary sub-band, reporting a channel quality indicator relative to the channel quality indicator of the primary sub-band within which lay the frequency of the respective secondary sub-band. FIG. 1 represents this embodiment for primary sub-band 110a, where coarse granularity CQI for that selected primary sub-band is reported and the fine granularity for the corresponding four secondary sub-bands 120a-1 to 120a-4 is reported relative to the corresponding coarse granularity CQI.

Block 212 addresses the embodiment in which it is the eNB (or other network access node) that selects the one or more primary sub-bands; the UE identifies the one or more primary sub-bands from a message it wirelessly receives from a network access node. Block 214 summarises the two-stage CQI reporting for this case. Specifically, the message of block 212 is wirelessly received at the UE in response to the UE reporting a channel quality indicator for each of the primary sub-bands in the set, which is the first phase. The second phase comes after the UE receives that message and includes the finer frequency-domain granularity reporting, where the UE reports a channel quality indicator for each secondary sub-band whose frequency lay within any of the identified one or more primary sub-bands.

For the reporting of the CSI for the primary sub-bands, and/or for the secondary sub-bands, these can be reported as PMI, CQI or joint PMI/CQI.

At blocks 202 and 204 there was reported the channel quality with the finer frequency-domain granularity for the selected one or more primary sub-bands of the set, and also was reported the channel quality for the other primary sub-bands of the set. As detailed in the examples above these can be reported with:
  sub-band indices to show correspondence between the respective sub-band and the respective channel quality; and/or
  a bit map to show correspondence between the respective sub-band and the respective channel quality.

Now are summarised some of the above embodiments from the perspective of the eNB (or other type of wireless network access node). First, the eNB receives from a UE channel state information for a set of primary sub-bands. Then it selects from the set one or more of the primary sub-bands for the reporting of channel quality with a finer frequency-domain granularity than what was received in the channel state information. As above, the selected one or more primary sub-bands is less than all primary sub-bands in the set. The eNB thereafter identifies to the UE the selected one or more primary sub-bands of the set, and subsequently receives from the UE, for each secondary sub-band whose frequency lay within an identified primary sub-band, an indication of channel quality with the finer frequency-domain granularity.

In more specific but non-limiting embodiments from the eNB's perspective, the eNB selects the one or more primary sub-bands: randomly; or as the primary sub-band(s) of the set having best channel quality.

In another non-limiting embodiment, the indication of channel quality with the finer frequency-domain granularity for each secondary sub-band is relative ($\Delta$CQI) to a reported channel quality indication for the primary sub-band having a frequency in which lay the respective secondary sub-band.

And finally in a still further non-limiting embodiment, the indications of channel quality with the finer frequency-domain granularity are received at the eNB with sub-band indices to show correspondence between the respective sub-band and the respective indication of channel quality.

The logic diagram of FIG. 2, and the summary above from the perspective of the eNB/access node, may be considered to illustrate the operation of a method, and a result of execution of a computer program stored in a computer readable memory, and a specific manner in which components of an electronic device are configured to cause that electronic device to operate, whether such an electronic device is the UE, the access node/eNB, or one or more components thereof such as a modem, chipset, or the like. The various blocks shown in FIG. 2 or described in text above may also be considered as a plurality of coupled logic circuit elements constructed to carry out the associated function(s), or specific result of strings of computer program code or instructions stored in a memory.

Such blocks and the functions they represent are non-limiting examples, and may be practised in various components such as integrated circuit chips and modules, and the exemplary embodiments of this invention may be realised in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a user equipment/mobile terminal or an access node/eNB, to perform the various functions summarised at FIG. 2 and above and (c) circuits, such as a microprocessor(s) or a portion of a microprocessor(s), that require software or firmware for operation, even if the software or firmware is not physically present. This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" also covers, for example, a baseband integrated circuit or applications processor integrated circuit for a UE or a similar integrated circuit in a network access node or other network device which operates according to these teachings.

Figure 3:
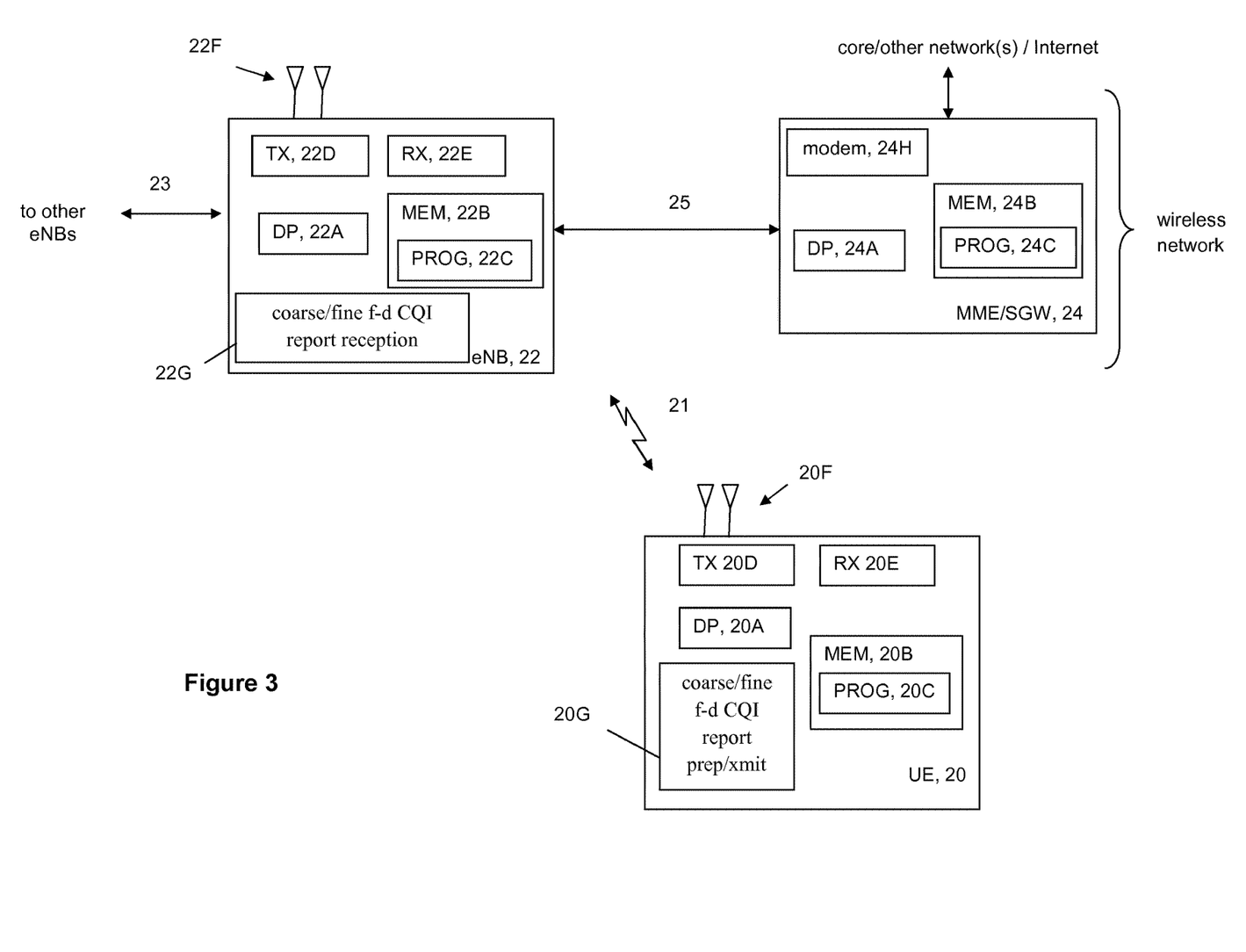
FIG. 3 shows a simplified block diagram of a UE and a wireless radio network represented by an eNB and by a serving gateway, which are exemplary electronic devices suitable for use in practising the exemplary embodiments of the invention.

Reference is now made to FIG. 3 for illustrating a simplified block diagram of various electronic devices and apparatus that are suitable for use in practising the exemplary embodiments of this invention. In FIG. 3 an eNB 22 is adapted for communication over a wireless link 21 with an apparatus, such as a mobile terminal or UE 20. The eNB 22 may be any access node (including frequency selective repeaters) of any wireless network, such as LTE, LTE-A, GSM, GERAN, WCDMA, WLAN and the like. The operator network of which the eNB 22 is a part may also include a network control element such as a mobility management entity MME and/or serving gateway SGW 24 or radio network controller RNC which provides connectivity with further networks (e.g. a publicly switched telephone network PSTN and/or a data communications network/Internet).

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the eNB 22 via one or more antennas 20F. Also stored in the MEM 20B at reference number 20G are the algorithms or look-up tables by which the UE 20 can know how to identify the sub-bands which it should measure and report the finer frequency-domain CQI according to any of the various teachings above.

The eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The eNB 22 stores at block 22G similar algorithms/look-up tables for being able to distinguish among, and utilise, the coarse and fine frequency-domain CQIs which it wirelessly receives form the UE as detailed above in various embodiments.

While not particularly illustrated for the UE 20 or eNB 22, those devices are also assumed to include as part of their wireless communicating means a modem and/or a chipset which may or may not be inbuilt onto an RF front end chip within those devices 20, 22 and which also operates utilising rules for the coarse and fine CQI measurement and reporting as set forth in detail above.

At least one of the PROGs 20C in the UE 20 is assumed to include a set of program instructions that, when executed by the associated DP 20A, enable the device to operate in accordance with the exemplary embodiments of this invention, as detailed above of which some are summarised at FIG. 2. The eNB 22 also has software stored in its MEM 22B to implement certain aspects of these teachings according to the above detailed embodiments. In these regards, the exemplary embodiments of this invention may be implemented at least in part by computer software stored on the MEM 20B, 22B which is executable by the DP 20A of the UE 20 and/or by the DP 22A of the eNB 22, or by hardware, or by a combination of tangibly stored software and hardware (and tangibly stored firmware). Electronic devices implementing these aspects of the invention need not be the entire devices as depicted at FIG. 3 and may be one or more components of same such as the above described tangibly stored software, hardware, firmware and DP, or a system-on-a-chip SOC or an application specific integrated circuit ASIC.

In general, the various embodiments of the UE 20 can include, but are not limited to, personal portable digital devices having wireless communication capabilities, including but not limited to cellular and other types of mobile telephones, mobile terminals, navigation devices, laptop/palmtop/tablet computers, digital cameras and music devices, and Internet appliances.

Various embodiments of the computer readable MEMs 20B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the LTE and LTE-A systems, as noted above the exemplary embodiments of this invention are not limited for use with only this one particular type of wireless communication system.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for controlling a user equipment (UE) to provide feedback about channel conditions, comprising:
identifying a subset of a plurality of primary sub-bands for reporting channel quality using a finer frequency-domain granularity than a frequency-domain granularity used to report channel quality in other primary sub-bands of the plurality of primary sub-bands, wherein prior to the subset being identified, measuring and reporting channel quality with the frequency-domain granularity other than the finer frequency-domain granularity of the primary sub-bands;

measuring and reporting channel quality with the finer frequency-domain granularity for each secondary sub-band included in a corresponding primary sub-band in the subset identified, a frequency range of each secondary sub-band being smaller than a frequency range of the corresponding primary sub-band; and further measuring and reporting channel quality with the frequency-domain granularity other than the finer frequency-domain granularity for each secondary sub-band included in a corresponding primary sub-band in the subset identified, wherein the subset of the plurality of primary sub-bands for reporting channel quality with the finer frequency-domain granularity include at least primary sub-bands having highest channel quality based on a signal-to-interference-plus-noise ratio (SINR), and the channel quality reported for each secondary sub-band is reported as a difference value relative to a channel quality reported for a corresponding primary sub-band.

2. The method according to claim 1, further comprising selecting, by the UE, the subset of the plurality of primary sub-bands.

3. The method according to claim 2, wherein the subset of the plurality of primary sub-bands for reporting channel quality with the finer frequency-domain granularity include at least sub-bands having highest variance in a measure of channel quality.

4. The method according to claim 2, wherein the reporting comprises:
reporting a channel quality indicator for each of the other primary sub-bands not in the subset identified; and
reporting only a channel quality indicator for each secondary sub-band of a corresponding primary sub-band in the subset identified.

5. The method according to claim 1, wherein the reporting comprises:
reporting a channel quality indicator for each primary sub-band in the subset identified.

6. The method according to claim 1, wherein the UE identifies the subset of primary sub-bands from a message wirelessly received from a network access node.

7. The method according to claim 6, wherein the message is wirelessly received at the UE in response to the UE reporting a channel quality indicator for each of the plurality of primary sub-bands; and
after receiving the message, reporting the channel quality with the finer frequency-domain granularity comprises reporting a channel quality indicator for each secondary sub-band of a corresponding one of the subset of primary sub-bands identified.

8. The method according to claim 1, wherein the method is performed by the UE which is a mobile phone.

9. An apparatus for controlling a user equipment (UE) to provide feedback about channel conditions, comprising:
circuitry configured to:
identify a subset of primary sub-bands from a plurality of primary sub-bands for reporting channel quality with a finer frequency-domain granularity than a frequency-domain granularity used to report channel quality in other primary sub-bands of the plurality of primary sub-bands, wherein prior to the subset being identified, measuring and reporting channel quality with the frequency-domain granularity other than the finer frequency-domain granularity of the primary sub-bands;
measure and report channel quality with the finer frequency-domain granularity for each secondary sub-band included in a corresponding primary sub-band in the subset identified, a frequency range of each secondary sub-band being smaller than a frequency range of the corresponding primary sub-band; and further measure and report channel quality with the frequency-domain granularity other than the finer frequency-domain granularity for each secondary sub-band included in a corresponding primary sub-band in the subset identified, wherein the subset of the plurality of primary sub-bands for reporting channel quality with the finer frequency-domain granularity include at least primary sub-bands having highest channel quality based on a signal-to-interference-plus-noise ratio (SINR), and the channel quality reported for each secondary sub-band is reported as a difference value relative to a channel quality reported for a corresponding primary sub-band.

10. The apparatus according to claim 9, wherein circuitry is further configured to cause the UE to select the one or more primary sub-bands.

11. The apparatus according to claim 10, wherein the circuitry is further configured to report the channel quality by:
reporting a channel quality indicator for each of the other primary sub-bands not in the subset identified; and
reporting only a channel quality indicator for each of the secondary sub-bands corresponding to primary sub-bands in the subset identified.

12. The apparatus according to claim 9, wherein the circuitry is further configured to cause the UE to identify the subset of the plurality of primary sub-bands from a message wirelessly received from a network access node.

13. The apparatus according to claim 12, wherein the message is wirelessly received at the UE in response to the UE reporting a channel quality indicator for each of the plurality of primary sub-bands; and
the circuitry is configured to cause the UE to report, after receiving the message, the channel quality with the finer frequency-domain granularity as a channel quality indicator for each secondary sub-band corresponding to primary sub-bands in the subset.

14. A method for controlling a network access node, comprising:
selecting a subset of primary sub-bands from a plurality of primary sub-bands for the reporting of channel quality using a finer frequency-domain granularity than a frequency-domain granularity used to report channel quality in other primary sub-bands not in the subset selected, wherein prior to the subset being identified, measuring and reporting channel quality with the frequency-domain granularity other than the finer frequency-domain granularity of the primary sub-bands;
notifying the user equipment of the subset of primary sub-bands selected;
receiving from the user equipment, for each secondary sub-band included in a primary sub-band included in the subset selected, an indication of channel quality with the finer frequency-domain granularity, a frequency range of each secondary sub-band being smaller than a frequency range of the corresponding primary sub-band; and
further receiving from the user equipment, for each secondary sub-band included in a primary sub-band included in the subset selected, an indication of channel quality with the frequency-domain granularity other than the finer frequency-domain granularity,
wherein the subset of the plurality of primary sub-bands for reporting channel quality with the finer frequency-domain granularity include at least primary sub-bands having highest channel quality based on a signal-to-interference-plus-noise ratio (SINR), and the indication of channel quality received for each secondary sub-band is received as a difference value that is relative to a corresponding indication of channel quality of a corresponding primary sub-band.

15. The method according to claim 14, wherein the network access node selects the one or more primary sub-bands randomly, as primary sub-bands having best channel quality, or both.

16. The method according to claim 14, wherein the indications of channel quality with the finer frequency-domain granularity are received with sub-band indices indicating a corresponding indication of channel quality.

17. The method according to claim 14, wherein the method is performed by the network access node and the network access node is an eNB operating in an LTE or LTE A system.

* * * * *